United States Patent
Li et al.

(10) Patent No.: US 7,639,392 B2
(45) Date of Patent: Dec. 29, 2009

(54) METHODS, SYSTEMS, AND MEDIA TO ENHANCE IMAGE PROCESSING IN A COLOR REPROGRAPHIC SYSTEM

(75) Inventors: Hong Li, Boulder, CO (US); Joseph Stanley Czyszczewski, Longmont, CO (US); James T. Smith, II, Boulder, CO (US)

(73) Assignee: Infoprint Solutions Company, LLC, Boulder, CO (US)

( * ) Notice: Subject to any disclaimer, the term of this patent is extended or adjusted under 35 U.S.C. 154(b) by 1312 days.

(21) Appl. No.: 10/693,760

(22) Filed: Oct. 24, 2003

(65) Prior Publication Data

US 2004/0190019 A1 Sep. 30, 2004

Related U.S. Application Data

(60) Provisional application No. 60/459,064, filed on Mar. 28, 2003.

(51) Int. Cl.
*H04N 1/58* (2006.01)
*H04N 1/48* (2006.01)

(52) U.S. Cl. .................. 358/1.9; 358/3.27; 358/504; 358/505; 358/3.08

(58) Field of Classification Search .................. 358/1.9, 358/3.27, 3.08, 504, 505, 406, 3.01, 3.06, 358/534, 536; 382/176
See application file for complete search history.

(56) References Cited

U.S. PATENT DOCUMENTS

| | | | |
|---|---|---|---|
| 4,288,821 A | 9/1981 | Lavallee et al. | |
| 4,433,346 A | 2/1984 | Stoffel et al. | |
| 4,447,830 A | 5/1984 | Stoffel | |
| 5,343,283 A | 8/1994 | van Dorsselaer et al. | |
| 5,384,648 A | 1/1995 | Seidner et al. | |
| 5,491,568 A | 2/1996 | Wan | |
| 5,510,896 A * | 4/1996 | Wafler | 358/296 |
| 5,721,096 A | 2/1998 | Karathanasis et al. | |
| 5,760,913 A | 6/1998 | Falk | |
| 5,852,678 A * | 12/1998 | Shiau et al. | 382/176 |
| 6,043,909 A | 3/2000 | Holub | |
| 6,195,456 B1 | 2/2001 | Balasubramanian et al. | |

(Continued)

FOREIGN PATENT DOCUMENTS

EP 0546773 A2 6/1993

(Continued)

*Primary Examiner*—Thomas D Lee
(74) *Attorney, Agent, or Firm*—Duft Bornsen & Fishman, LLP

(57) ABSTRACT

Methods, systems, and media to enhance image processing for a color reprographic system are disclosed. Embodiments of the invention may calibrate a component like scanner and/or printer in response to user input and/or coupling the component to the reprographic system. More specifically, embodiments may generate correction parameters that describe differences in color values between an image scanned by a scanner or an image printed by the printer by comparing the outputs to known characteristics like color values for the image. Some embodiments comprise a graphical user interface (GUI) to communicate with the user, allowing the user to select user preferences to change, for example, the brightness of an image being copied. Further embodiments incorporate network and phone system interfaces to communicate with remote components as well as to receive input from and/or output to other systems via email, facsimile, etc.

26 Claims, 6 Drawing Sheets

U.S. PATENT DOCUMENTS

| | | |
|---|---|---|
| 6,252,676 B1 | 6/2001 | Azima et al. |
| 6,256,111 B1 | 7/2001 | Rijavec |
| 6,295,388 B1 | 9/2001 | Stokes et al. |
| 2002/0021321 A1 | 2/2002 | Nakajima et al. |

FOREIGN PATENT DOCUMENTS

| | | |
|---|---|---|
| EP | 0863458 A2 | 9/1998 |
| EP | 1091566 A2 | 4/2001 |
| JP | 11164162 A | 6/1999 |
| JP | 2001016451 A | 1/2001 |

\* cited by examiner

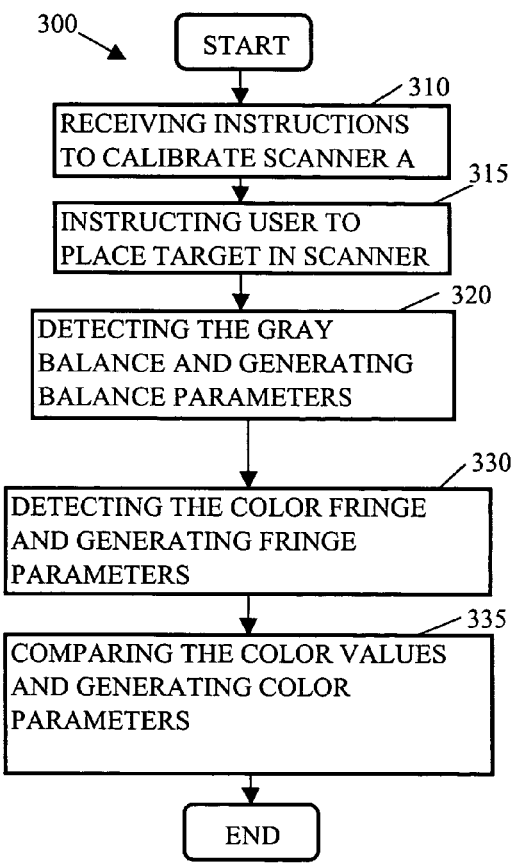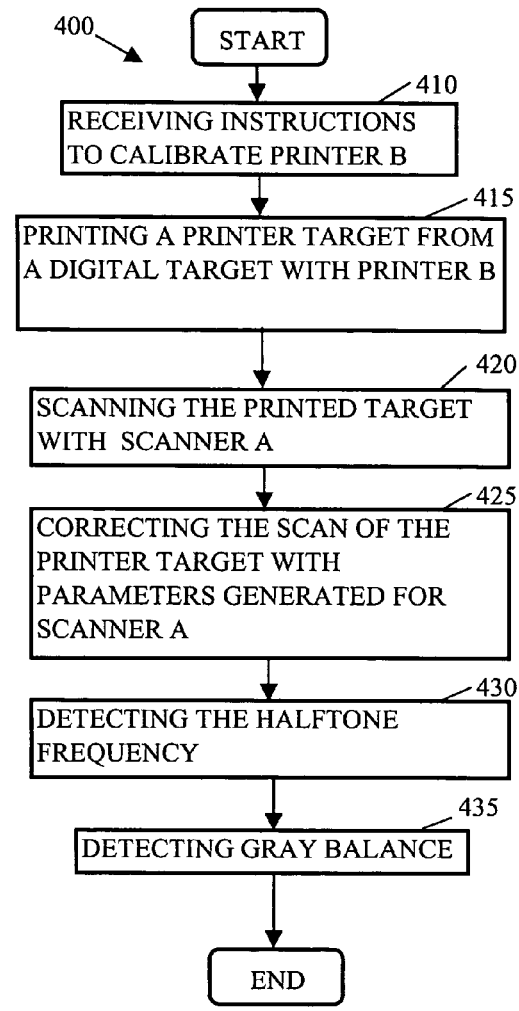

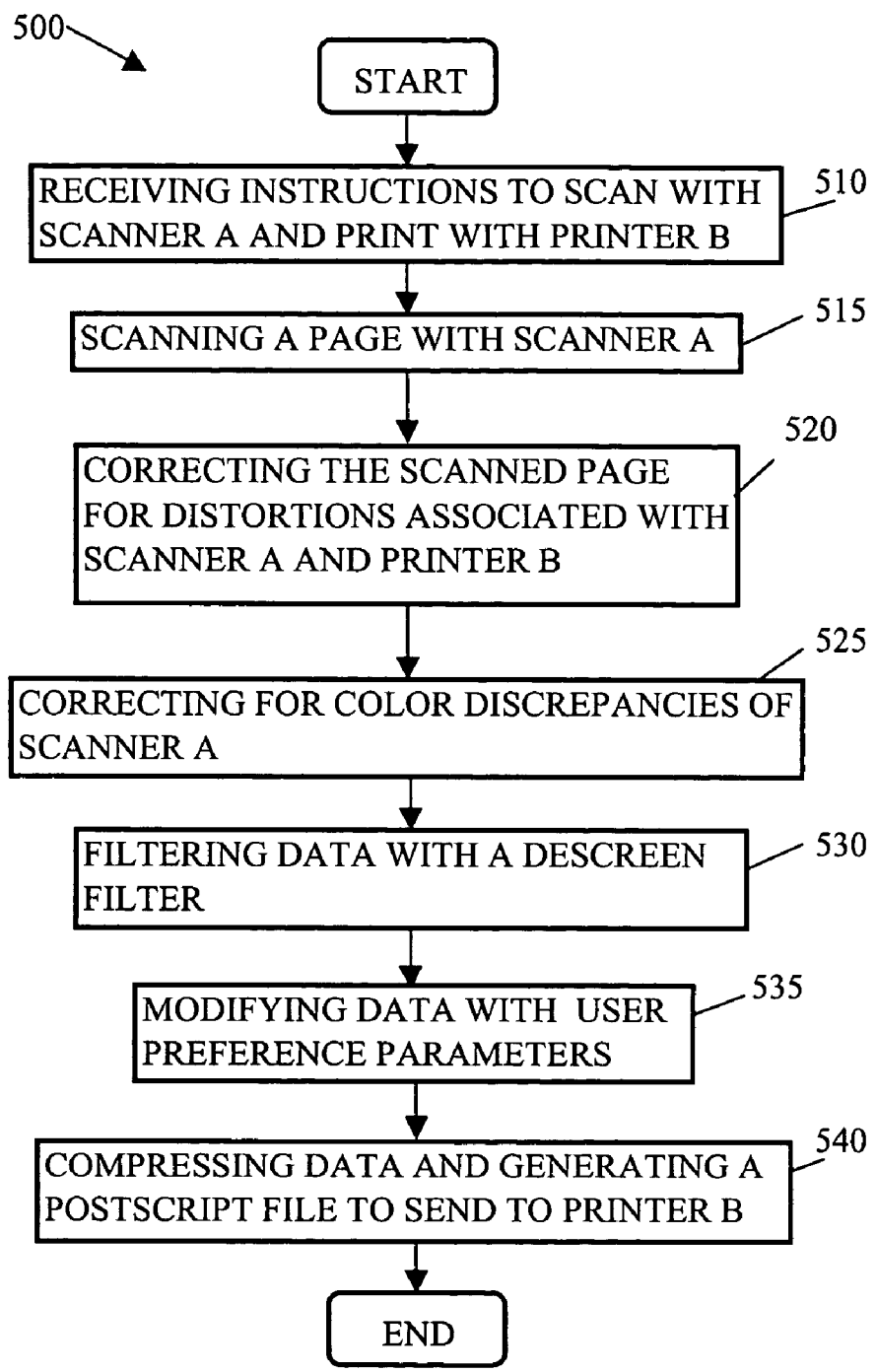

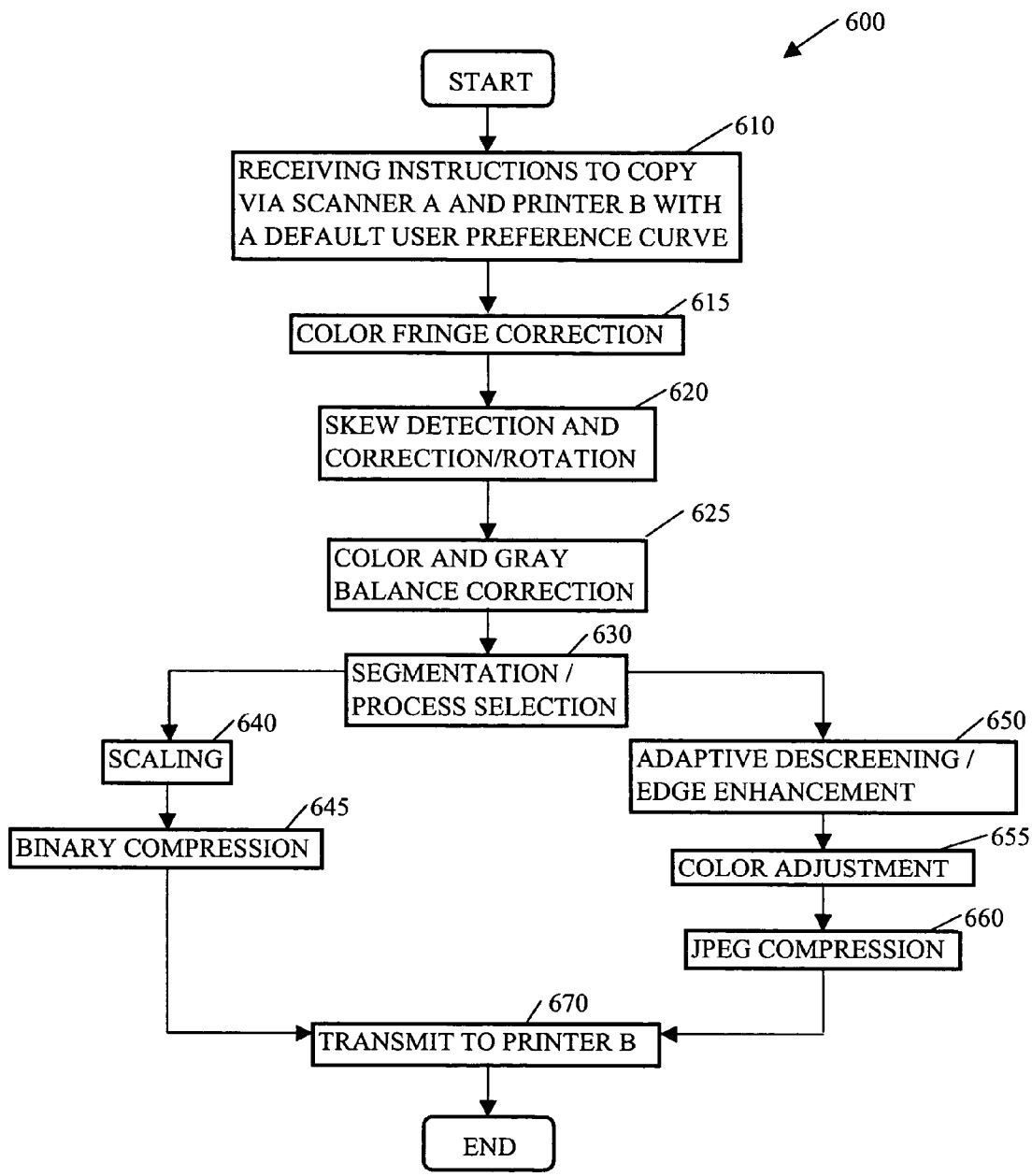

METHODS, SYSTEMS, AND MEDIA TO ENHANCE IMAGE PROCESSING IN A COLOR REPROGRAPHIC SYSTEM

CROSS-REFERENCES TO RELATED APPLICATIONS

Pursuant to 35 USC §119(e), this application claims priority to and the benefit of U.S. Provisional Patent Application No. 60/459,064, filed Mar. 28, 2003, which is incorporated herein in its entirety for all purposes.

FIELD OF INVENTION

The present invention relates to the field of color reprographic systems and more particularly to methods, systems, and media for enhancing image processing for a color reprographic system based upon the component(s) utilized and automatic enhancement in response to the touch of a button for average users, to optimize or improve image quality.

BACKGROUND

A reprographic system includes a scanner for scanning paper documents and pictures and storing them into electronic files, image processing software and/or hardware for storing, transmitting, and manipulating the files, and a printer for printing copies of the processed images. Traditional reprographic systems are 'closed' systems having a dedicated, integrated scanner and printer like a photocopier. The dedicated scanner and printer are initially calibrated to operate together by the manufacturer and, after the copier is installed, periodically by a specialized service technician. Technicians manually calibrate the systems with tools and reference materials unavailable to average users and with specialized training.

Modern reprographic systems are moving toward a modular structure, often supporting multiple scanners and multiple printers in a defined architecture. Such systems can also include other output destinations for images, such as facsimile, e-mail, etc. and individual components have unique image characteristics. Manual calibration of these individual components quickly becomes cumbersome, especially for calibration of and selection of enhancement tools for color components.

Color components add to the complexity of calibration since color scanning components typically generate data in a red, green, and blue (RGB) color space and printers typically print in a cyan, magenta, and yellow (CMY) color space or a cyan, magenta, yellow, and black (CMYK). Thus, in color systems, calibration must not only account for differences in tone levels of black, but also variances in three other color levels and interrelationships between the color levels and distortions related to different processing techniques of the various components. More specifically, when a color scanner scans a color image, a mix of, e.g., red, green, and blue bits represent each color of the image including black. Distortions involved with the scanning process can cause one or more, or even all of the hues in the color image to be misrepresented by the scanner with regards to color values of pixels and pixel locations. With regards to sharp black images like black text, misalignments of the scanner optics can cause misalignments of pixels, changing black pixels of the text into pixels with one or more color casts.

Distortions involved with color printing processes can cause the red, green, and blue pixels to be misrepresented in CMYK color space on paper, further compounding the errors. Such distortions, which are inherent to color document reproduction on a modular, reprographic system, require multiple combinations of complex image correction or enhancement processes. The number and settings for each of the multiple combinations depend upon the distortions associated with a selected scanner and printer and the original document to be reproduced, as well as how these distortions interact. Having an average user select each the image enhancement algorithms and their settings to produce a suitable copy each page of each document is an impracticable solution for most applications, but failing to adequately correct for distortions, even if an acceptable copy of a high quality original can be made, would significantly degrade image quality as copies are reproduced.

SUMMARY OF THE INVENTION

The problems identified above are in large part addressed by a method and system to enhance image processing of a color reprographic system. Embodiments of the invention may calibrate a component like scanner and/or printer in response to user input and/or coupling the component to the reprographic system as well as select image enhancement tools based upon characteristics of the actual components used and the documents being reproduced. More specifically, in a first calibration or characteristics detection stage, embodiments may generate correction parameters that describe differences in color values between an image scanned by a scanner or an image printed by the printer by comparing the outputs to known characteristics like color values for test targets. In a second real-time document reproduction stage, based on the detected printer characteristics, the post-scan image processing will be dynamically configured to optimize image quality and performance for color reprographic systems. The documents being reproduced may be evaluated, e.g., for skew, to select appropriate enhancement tools to improve the reproduction of the documents. Several embodiments comprise a graphical user interface (GUI) to communicate with the user, allowing the user to select user preferences to change, for example, the darker/lighter adjustment could be selected as a user preference. Some embodiments incorporate network and phone system interfaces to communicate with remote components as well as to receive input from and/or output to other systems via email, facsimile, etc.

BRIEF DESCRIPTION OF THE DRAWINGS

Other objects and advantages of the invention will become apparent upon reading the following detailed description and upon reference to the accompanying drawings in which, like references may indicate similar elements:

FIGS. 3-7 depict example flow charts of a method to enhance image processing for a color reprographic system, including flow charts focused on static corrections based upon components selected and dynamic corrections based upon the components selected as well as the documents being reproduced.

DETAILED DESCRIPTION OF EMBODIMENTS

Figure 1:
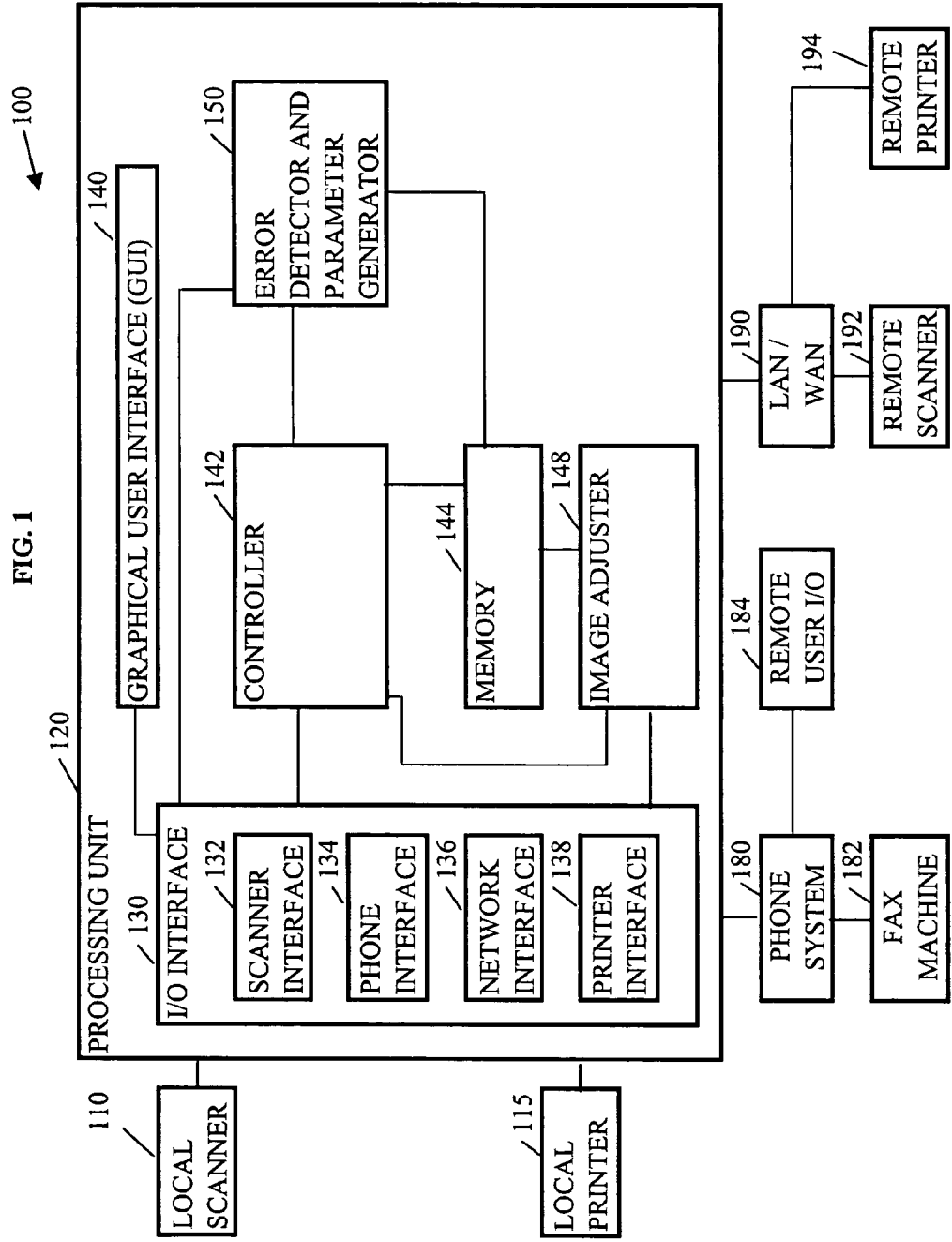
FIG. 1 depicts an embodiment of a reprographic system having local and remote, components and user access.

The following is a detailed description of example embodiments of the invention depicted in the accompanying drawings. The example embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, the invention contemplates an automated, user-friendly system and method for enhancing image processing in a modular color reprographic system. The system includes one or more scanners, one or more printers, and a data processing device or computer connected to them. In a modular embodiment, the scanner(s), printer(s), and computer are discrete elements connected to each other via a cable or wireless link. The computer provides a graphical user interface (GUI) that enables an unskilled user to dynamically enhance or select image processing components for each scanner and printer by simply pressing a button. Calibration or scanner/printer characterics detection is typically invoked in a first stage when a new scanner or printer is introduced or from time to time to update existing correction parameters. The user interface guides the user through a first stage process that includes scanning a target having known characteristics with the scanner to generate scanner target data. The computer receives the scanner target data from the scanner via a scanner interface. An error detector coupled to the scanner interface compares the scanner target data to known target data and a parameter generator then generates scanner correction parameters indicative of the scanner's characteristic distortion, i.e., the differences, such as gray balance, color fringe, and color value differences, between the scanner target data and the known target data. In real-time copy, when the computer receives subsequent image data from the scanner, it uses the scanner correction parameters to modify the scanned data to compensate for the scanner's distortion and then dynamically configures different post-scan image processing for outputs with different technologies and characteristics, thereby providing a good quality reproduction to the printer, an email, a facsimile, or more than one of such destinations.

The user interface may further guide the user through a printer characteristics detection process in which the known, digital target is printed and scanned by an image enhanced, or corrected scanner. Then, the computer can derive printer correction parameters or store certain printer characteristics for selecting post-scan image processing components. The printer correction parameters include gray balance, descreen filters. The descreen filters compensate for halftones inherent to the printer and/or the original image. The resulting printer correction parameters are then stored on the computer and invoked in a second stage when image data is to be sent to that printer, compensating for the printer's characteristic distortion. Based on the dectected characteristics of the printer, different post-scan processing components are dynamically configured for both image quality and performance optimization. Some embodiments also invoke a segmenter in the real-time copy stage to separate the black text and line-art from the color images in the scanned corrected data so different types of image content can be processed differently for optimized image quality and performance. Black text, for example, is sent to the printer with high resolution binary black, while color image is descreened with appropriate filters to avoid halftone interference (Moiré) patterns. In this manner, the computer includes scanner and printer correction parameters for each scanner and printer on the system. A document can then be evaluated in the second stage and enhanced dynamically for reproduction with a minimum of distortion using any scanner/printer combination. The user interface may also permit the user to impose preferences on the reproduced document like brightness, contrast, and color saturation by incorporating user preference parameters. Note that the first stage of this process is performed to add scanners or printer and to update calibration of existing scanners or printers. Processing begins with the second stage occurs when a user wants to make a copy with calibrated scanners and printers.

Turning now to the drawings, FIG. 1 depicts an embodiment of a system 100 for enhancement of image processing for a color reprographic system. System 100 includes a local scanner 110, a local printer 115, a processing unit 120, a phone system 180 coupled with fax machine 182 and remote user input-output (I/O) 184, and a local area network/wide area network (LAN/WAN) 190. Local scanner 110 and local printer 120 may include one or more scanners and printers in a conventional copy room such as work group scanners, laser printers, and inkjet printers. In some embodiments, local scanner 110, local printer 115, and processing unit 120 may be adapted to couple to appear as a conventional photocopier although these components offer the flexibility of a loosely coupled reprographic system. For instance, a conventional photocopier has a scanner integrated with the printer. Such a scanner is physically and functionally inseparable from the printer. Local scanner 110, on the other hand, can scan images to print to a different local printer, or a remote printer, such as remote printer 194. Printing to remote printer 194 may be more convenient for the user because local printer 115 may run out of ink, remote printer 194 may be located in the user's office, and/or a large document may be printed and remote printer 194 may print at a faster rate.

Processing unit 120 includes the software, firmware, and/or hardware to loosely couple and enhance image processing for any scanner and any printer to form a reprographic system. In particular, processing unit 120 couples with a component like a scanner or printer, generates correction parameters based upon a difference between color values output from the component and suitable or expected color values, and dynamically selects and applies the correction parameters to image data when the component is used. For instance, when a corrected scanner is used, the scanner correction parameters generated for that particular scanner provides a basis for adjusting the data scanned from an image by that scanner. Differences in color values identified by the scanner to identify color values may be non-linear depending upon the intensities of red, green, and blue pixels used to characterize the color levels and, within a gray patch, the scanner may not provide equal values of each color, resulting in color values of pixels representative of gray patch having color cast. In some embodiments, processing unit 120 also incorporates a standard set of correction parameters based upon known distortions associated with certain models of scanners and printers.

Processing unit 120 may be implemented in the form of software executed on a personal computer via an I/O device such as a touch screen or a specific purpose machine and has an I/O interface 130, a GUI 140, a controller 142, an error detector and parameter generator 150, a memory 144, and an image adjuster 148. I/O interface 130 facilitates communication between processing unit 130 and other, typically external, components of a reprographic system. More specifically, I/O interface 130 includes interface hardware and drivers to allow processing unit 120 to scan, print, fax, send and receive emails, send and receive facsimiles, interact with remote users, utilize remote reprographic components, and deposit files in or obtain files from file folders. I/O interface 130 includes a scanner interface 132, a phone interface 134, a network interface 136, and a printer interface 138.

Scanner interface 132 can include one or more local scanner ports such as a small computer system interface (SCSI) port, a universal serial bus (USB) port, and a fire wire port. Processing unit 120 may instruct a scanner to feed a form, scan data from that form, and transmit the scanned data to I/O interface 130 via scanner interface 132.

Phone interface 134 facilitates the use of a digital and/or analog phone system, like phone system 180, by processing unit 120. In particular, phone system 180 can be used by processing unit 120 to send and/or receive data via a legacy color fax machine like fax machine 182 or a modem or modem software. For example, fax machine 182 may include a scanner to initiate facsimiles and a printer to output facsimiles. A user, via remote user I/O 184, may instruct processing unit 120 to enhance image processing for the scanner associated with fax machine 182. Processing unit 120 may instruct the user, via phone interface 134, to insert a target into fax machine 182 and to transmit or fax the scanned image to processing unit 120 via phone interface 134. The target is a standard scanning IT8 target such as Kodak Q60. Upon receiving the scanned data from fax machine 182, processing unit 120 automatically generates correction parameters for fax machine 182 to improve or optimize the performance of the scanner of fax machine 182 when fax machine is transmitting scanned images to processing unit 120. Further, when actually scanning a document for reproduction, fax machine 182 may skew, or distort the rectangularity of the document being scanned. Processing unit 120 may recognize the skew and dynamically select an enhancement tool to correct or substantially correct the skew.

In addition, after generating correction parameters for the scanner of fax machine 182, processing unit 120 may output or fax a file of a digital step wedge to print via fax machine 182. The digital step wedge provides a print having, for example, 16 steps of equal RGB gray, 16 steps of cyan, 16 steps of magenta, 16 steps yellow, and 16 steps of black to provide a basis for gauging the accuracy of color representations output by the printer of fax machine 182. Processing unit 120 then instructs the user to scan the printed target with the corrected scanner of fax machine 182 and compares the scanned data to the original digital step wedge file to generate correction parameters for the printer of fax machine 182.

Network interface 136 facilitates communication between processing unit 120 and remote components of the reprographic system such as remote scanner 192 and remote printer 194. In some embodiments, network interface 136 may also facilitate communication between processing unit 120 and remote users, office locations, or similar processing units of remote office locations. For instance, LAN/WAN 190 may couple processing unit 120 with a processing unit of a second office via the Internet. A user local to processing unit 120 may want to transfer physical copies of a document to an associate in the second office. In conventional office situations, the user would either fax the document to the second office if the document is short, or send the document by courier or mail. This user, however, decides to scan the document via local scanner 110 and print the document in the second office. Processing unit 120 optimizes the scanned data of the documents with a correction parameters for local scanner 110, compresses the scanned data, and transmits the compressed, scanned data to a processing unit in the second office. The processing unit in the second office optimizes the scanned data for a targeted printer in the second office based upon a correction parameters generated for the targeted printer before printing the document. In other embodiments, network interface 136 may facilitate enhancing image processing for and printing emails or email attachments received via processing unit 120.

Printer interface 138 facilitates printing data representing images and documents via printers like local printer 115 and remote printer 194 via network interface 136. In particular, printer interface 138 includes a network connector such as an RJ-45 connector for an Ethernet connection and protocols to instruct a printer to print an image or document from a file, such as a postscript file.

GUI 140 includes input devices and output devices to interact with a user via a graphical format. GUI 140 may include a transparent touch screen input device overlaying a graphical display to allow the user, for example, to press buttons designed to instruct processing unit 120 to initiate one or more actions. For instance, GUI 140 may display buttons such as calibrate printer, calibrate scanner, scan, print, copy, fax, email, save to file, lighter/darker, less contrast/more contrast, desaturate, and the like. The user can select a function such as calibrate scanner by simply pressing the calibrate scanner button to initiate the calibration process for the scanner.

Controller 142 coordinates actions of the reprographic system and facilitates automatic image processing enhancement for components of the reprographic system at the touch of a button in response to user input like the calibrate scanner button or user actions such as coupling a scanner to scanner interface 132. Controller 142 responds to user input like the calibrate scanner button by automatically implementing calibration procedures to generate correction parameters for a scanner. More specifically, if a new scanner has been detected, such as local scanner 110, and the user presses calibrate scanner, controller 142 will instruct GUI 140 to inform the user to place the target in local scanner 110. In some embodiments, local scanner 110 will indicate that a document has been placed on the flatbed or in the auto-feeder for the scanner. In other embodiments, the user may confirm that the target is in local scanner 110. Then, controller 142 instructs local scanner 110 to scan the document and transmit the scanned data to processing unit 120.

Upon receipt of the scanned data, error detector and parameter generator 150 compares the scanned data to target data (either measurement data or published data) in response to instructions from controller 142. Error detector and parameter generator 150 couples with memory 144 to retrieve target data that includes data describing the expected color values and expected distribution of the color levels from scanning the target and compares the expected data to the color values reported by local scanner 110. Differences in the expected and actual color values are detected, correction parameters are generated, and the correction parameters are stored in memory 144. In other embodiments, correction parameters and/or expected data for the target are stored in local and/or remote locations rather than in memory 144 and can be retrieved via I/O interface 130.

In some embodiments, error detector and parameter generator 150 may be adapted to convert cyan, magenta, and yellow (CMY) formatted data or cyan, magenta, yellow and black (CMYK) formatted data into red, green, and blue (RGB) data to facilitate error detection and parameter generation in the RGB color space. Such embodiments may include converters, such as CMY to RGB, and CMYK to RGB converters for comparison of color values between scanned data and printer files.

Error detector and parameter generator 150 may detect color fringe and gray balance of scanners in addition to color values in the scanner calibration or scanner characteristic detection stage, and skew in the real-time copy stage. For example, upon scanning a target having a gray patch with known values, the scanned, RGB data outlining the gray patch is evaluated to determine the extent to which the scanner detects a color cast, indicative of defocused lenses, referred to as a color fringe problem. After detecting the extent of the color fringe problem, error detector and parameter generator 150, can implement an algorithm to generate correction parameters to attenuate or eliminate color fringe for subsequent documents scanned by the same scanner.

Similarly, controller 142 responds to a user input like the calibrate printer button by automatically implementing procedures to enhance image processing for a printer. Controller 142 instructs a printer, like remote printer 194, to print a digital file of a target such as a step wedge and then instructs the user to place the printed target in a corrected scanner like remote scanner 192. Remote scanner 192 indicates that a document has been placed on the flatbed and controller 142 instructs remote scanner 192 to scan the document. Upon receipt of the scanned data, controller 142 instructs error detector and parameter generator 150 to compare the scanned data to target data, e.g. the digital file used to print the target.

Error detector and parameter generator 150 may, in the printer characteristics detection stage, detect gray balance and halftones associated with remote printer 194 in addition to color values. When a clustered halftone or line screen is used in the printer, halftone originals can interact with the printer halftone to create a Moiré pattern. The Moiré pattern is caused by the interaction of two periodic structures with different but nearly similar frequency. Thus, when the frequency of the halftones is a regular pattern, e.g., the printer software does not implement error diffusion to mask halftoning and the frequency of halftones is low such as 170 dots per inch (dpi), halftones associated with the printed image can interact with halftones associated with other printers or output devices to create a Moiré pattern. A Moiré pattern is an undesirable pattern that results from angles of overprinting halftone, e.g. when scanning a halftone like scanning images taken directly from magazines and printing the same with a halftone pattern. Thus, after determining the halftone frequency of remote printer 194, correction parameters are developed to diffuse the halftone pattern associated with remote printer 194.

On the other hand, controller 142 also receives instructions from the user such as copy, scan, and print, which involves dynamic image enhancement such as skew correction and vertical and horizontal alignment correction. In such instances, controller 142 instructs image adjuster 148 to implement correction parameters related to the action, such as scanner correction parameters, user preference parameters, and printer correction parameters for a copy command or scanner correction parameters and user preference parameters for a scan command. The parameters provide a basis for adjusting data of an image to enhance or optimize image handling by the reprographic system. In other embodiments, a scan command may involve adjusting data scanned from an image with scanner correction parameters.

Image adjuster 148 receives instructions from controller 142 to receive the scanned data from local scanner 110 and correction parameters from memory 144 and implement adjustments to the scanned data based upon the correction parameters. In some embodiments, image adjuster 148 may retrieve scanner correction parameters for local scanner 110 from memory 144 in response to a scan instruction from the user. Dynamic corrections may also be implemented by detecting and implementing an enhancement tool to correct for, e.g., vertical and/or horizontal misalignment. Upon adjusting the scanned data, the adjusted, scanned data is output to location(s) and in format(s) indicated by the user or to a default location in a default format.

Similarly, in response to a print command, data of an image to print is adjusted based upon parameters generated to enhance image processing for the printer on which the image is printed. User preference parameters may also be implemented if the user instructs the reprographic system to adjust the print, for example, to be darker or lighter.

In response to a copy command, controller 142 may prompt the user for preferences, wait to receive user preferences, or use the user preferences as selected prior to the user requesting a copy. Since the scanners and printers are loosely coupled in the reprographic system, one user preference may include selecting the scanner and selecting the printer to use for copying. For example, processing unit 120 may be adapted to operate as a console within a personal computer in an office. A scanner, such as local scanner 110, may reside in that office so a user, the occupant of the office, may desire to copy documents with local scanner 110 to a printer, such as remote printer 194, which is located in a more central location in the office but offers high print quality and resolution. The user launches processing unit 120 as a console on the personal computer and selects copy. Since processing unit 120 resides on the users personal computer, the user set default user preferences and default component selections based upon the user's personal preferences. The user's default scanner selection is local scanner 110 and the user's preferences include a custom command in the console to switch to remote printer 194. In other embodiments, a department of a company may adapt the console of processing unit 120 to allow a user to select from printers and scanners assigned to the department while defaulting to a local printer and scanner.

Controller 142 receives the copy command from the user and dynamically instructs image adjuster 148 to use correction parameters associated with local scanner 110, remote printer 194, and one or more user preferences. Image adjuster 148 adjusts the data scanned from each page of the document fed to local scanner 110 prior to printing the documents via remote printer 194.

Figure 2:
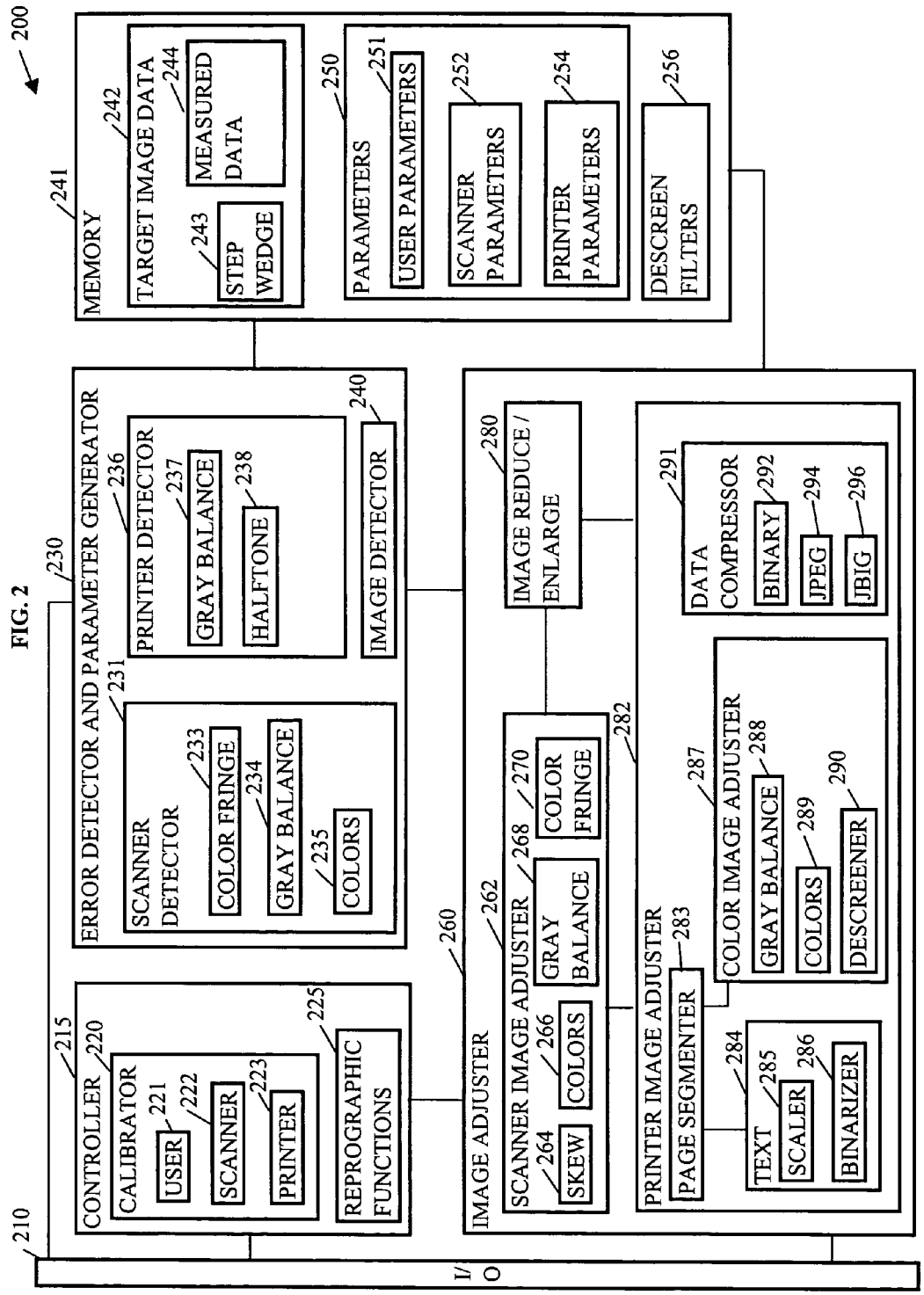
FIG. 2 depicts an embodiment of an apparatus for automatically enhancing image processing in a color reprographic system.

Referring now to FIG. 2, there is shown an embodiment of an apparatus 200 to enhance image processing for a color reprographic system. Apparatus 200 may include a specific purpose system like a state machine or specific purpose processor, a general purpose machine configured by software to execute aspects of the invention, combinations of the two, or the like. Apparatus 200 includes an I/O interface 210, a controller 215, an error detector and parameter generator 280, memory 241, and image adjuster 260. I/O interface 210 provides an interface to facilitate communication with users, scanners, printers, fax machines, and the like.

Controller 215 is designed to coordinate functionality of the reprographic system in response to communication with a user. Controller 215 includes calibrator 220 and reprographic functions 225. Calibrator 220 coordinates image enhancement processing for scanners and printers or imposes user preferences in response to the user pressing a button. More specifically, calibrator 220 includes user 221, scanner 222, and printer 223. User 221 includes circuitry to allow a user to adjust tone qualities of images handled by the reprographic system such as contrast, lightness and darkness, saturation, and other qualities such as size enlargement and reduction. For instance, a user may press a calibration button to indicate a desire to modify user preference parameters, initiating user 221. User 221 may prompt the user to determine the preferences and based upon answers, temporarily or permanently change the user preferences for copying operations. The user may select an increase in contrast when copying documents as a default setting. As a result a pointer in memory 241 points to user preference parameters in user parameters 251 that are designed to increase the contrast of image data. In many embodiments, however, controller 215 includes default settings and does not include user preferences to select the types of corrections to perform.

Scanner 222 includes circuitry to enhance image processing or re-determination of correction parameters for a scanner. Upon initiation of scanner 222, scanner 222 instructs the user to place a scanner calibration target in the scanner that has a corresponding electronic file in target image data 242 of memory 241. The scanner calibration target is scanned and image processing for the scanner is automatically corrected to produce an image quality based upon the errors detected in the color values, color fringe, and gray balance produced by the scanner. In particular, scanner 222 instructs error detector and parameter generator 230 to compare the color values, color fringe, and gray balance of the scanned data against the measured data 244. Error detector and parameter generator 230 determines differences in pixels indicated in measured data 244 such as measured density data and other color metric data and the scanned data. Based upon the differences, error detector and parameter generator 230 determines correction parameters to associate with that scanner and the correction parameters are stored in scanner parameters 252.

Similarly, printer 223 is designed to dynamically configure post-scan image processing components or generate correction parameters for a printer. Step wedge 243 is a target that can be used to enhance image processing for the printer. Printer 223 outputs step wedge 243 to the printer, prompts the user to place the printed target in a corrected scanner and scans the printed target. Upon comparing the data scanned from the printed target against step wedge 243, error detector and parameter generator 230 generates printer correction parameters and stores the correction parameters in printer parameters 254, associating the correction parameters with that printer.

Reproduction functions 225 include functions like copy, scan, fax, print, email, and distribute to shared file folder(s). The copy function initiates a function similar to a conventional photocopier, however, unlike the conventional copy function, the copy function allows the user to specify one or more scanners to perform the document scans and printers to print the copies. For instance, a memo is created and needs to be delivered to several persons of an organization. The copy function facilitates selection of multiple personal printers of persons within the organization. After selecting the personal printers of persons that should receive the memo, the memo is scanned once, dynamically enhanced, and delivered to the personal printer of every person on the list to receive the memo. Other embodiments provide for group lists.

The fax function initiates a function similar to a conventional fax machine; however, any corrected scanner may be selected to improve the quality of the fax. In some embodiments, a modem fax function may be implemented in conjunction with a scanner and, in other embodiments, a corrected fax scanner may be used. The fax function also provides for faxing to group lists.

The scan function initiates a function similar to the copy function but the scan function delivers the output in the form of an electronic file. The electronic file may be saved to one or more locations on a network, faxed to a fax machine or computer, or emailed.

The print function initiates a function to print an electronic file like an email attachment or an image file to one or more local or remote printers. For instance, the memo may be printed via the reprographic system to personal printers of several persons of an organization since the print function facilitates selection of multiple printers.

Error detector and parameter generator 230 compares scanned pixel values against measured data, or corrected scanned values against known digital values. The differences detected provide a basis for generating correction parameters for a component of the reprographic system such as a scanner or a printer. In particular, when an uncalibrated scanner scans a scan target, error detector and parameter generator 230 implements scanner detector 231, which includes a number of algorithms to determine and generate parameters to correct or attenuate errors related to the scanner. On the other hand, when a corrected scanner scans a printed image, error detector and parameter generator 230 implements printer comparator 236, which includes a number of algorithms to determine and generate parameters to correct or attenuate errors related to the printer.

In some embodiments, error detector and parameter generator 230 includes converters to convert RGB color space data to other color spaces for comparison and/or storage in memory 241. For instance, scanned data may be converted into other color spaces like color spaces supported by International Color Consortium (ICC) specifications such as ICC.1:2001-12 or other national, international, or Internet standards. In further embodiments, scanned data may be converted into CMY or CMYK to facilitate direct comparisons with printer files.

In many embodiments, the number, types, and processes of image corrections may be modified and/or updated. In particular, error detector and parameter generator 230 can be implemented by a number of software or firmware applications and the applications may be stored in volatile memory like RAM, programmable read only memory (PROM), erasable programmable read only memory (EPROM), electrically erasable programmable read only memory (EEPROM), flash memory, a hard drive, and the like so that newer versions of the software or firmware or additional software or firmware can be incorporated into error detector and parameter generator 230.

Scanner detector 231 may include functions like color fringe 233, gray balance 234, and colors 235, among others. Color fringe 233 detects red, green and blue color planes misalignment with each other spatially due to the optical and mechanical design of a scanner. The sharp edge area around with gray patches in the IT8 scan target are scanned and analyzed and a curve of gray value (digital count) vs. pixel spatial position is generated. If the three, color planes of the scanner are properly registered, the three RGB curves for a gray edge should be the same. If there is misregistration between color planes, the three curves will be separate from each other. The difference between the color planes is the color fringe error. Color fringe 233 recognizes the offset and generated correction parameters to compensate the error. Several embodiments generate correction parameters for color fringe errors when the resulting distortion exceeds a color fringe threshold.

Gray balance 234 detects the calibration of the optics of the scanner to determine whether the scanner perceives gray as a human does. Gray balance 234 may compare color values associated with gray patches of a scanned target with a corresponding digital target like measured data 244 to determine whether the is gray patch has a color cast. The scanner should interpret gray patches as having equal or approximately equal color values of red, green, and blue. When scanner generates color values that are not equal, the scanner perceived the gray patch as having a color cast, meaning that, e.g., the scanner interprets red as a higher color level than the blue and green counterparts. Further, the color cast may vary based upon the gray level of the gray patch so gray balance 234 may generate correction parameters in the form of a curve associating color levels with color values generated by the scanner to facilitate correction of the linearity of scanned data from the scanner. If the gray balance of the scanner is within a suitable distortion range, however, some embodiments are configured to ignore the distortion for increased document throughput.

Colors 235 may compare the scanned values of the IT8 target against the measured calorimetric values 244 and generate correction parameters for correct or attenuate errors in the scanned data. More specifically, color 235 may generate three independent 1-D tone reproduction curves to convert non-linear and linear RGB values and a 3×3 color correction matrix between the linear RGB values and calibrated RGB or XYZ values, where calibrated RGB or XYZ values are international standard color specifications. Colors 235 could also be other forms of conversion such as 3×N matrix, polynomial data fitting or 3D Look-up Table, other international standard color spaces, such as CIELAB, can be used as color interchange space instead.

In several embodiments, scanner detector 231 may develop two or more sets of correction parameters for scanners with two-sided scanning techniques. In particular, some scanners offer the dual optics to scan two sides of a document, however, the scanning technique for the second side of the document is different from and prone to different distortions than scans of the first side of the document. Thus, in the first stage, correction parameters can also be generated for the second side of documents, which are subjected to the alternative scanning technique.

Printer comparator 236 may include functions like gray balance 237, and halftone 238, among others. Similar to gray balance 235, gray balance 237 interprets scanned data of a printed target to determine whether the printer misrepresents a color level, causing a gray patch to have a color cast. For example, a printer to be calibrated may print a digital file of a target such as step wedge 243 and a calibrated scanner scans the printed target. The color values of the scanned data may be corrected for gray balance problems associated with the scanner by image adjuster 282. Then, the resulting color values are compared with step wedge 243 to generate correction parameters to reduce the distortion associated with gray balance of the printer. The correction parameters are then stored in printer parameters 254 and associated with that printer.

Halftone 238 includes algorithms to identify halftones incorporated in the printed target by a printer. Halftone is a well-known technique for converting a continuous tone image into a binary image for printing or display by a binary device. Different halftone algorithms are used in various printing technologies. Commonly used are clustered halftone, dispersed halftone, stochastic halftone, line screen and error diffusion. Halftones are detected by scanning the CMYK step edge and searching for a halftone frequency. The detected halftone frequency is used to determine if a descreening may use a descreening filter to remove certain halftone frequency while causing image blurring. Adaptive descreening technique is used to remove the halftone in the smooth area while enhancing the edge at edge area. Several descreen filters have been developed to target different frequency ranges and are stored in descreen filters 256 of memory 241 and image adjuster 260 selects a descreen filter based upon the frequency and halftones associated with the printer and the scanned data.

Memory 241 includes data storage for target image data 242, correction parameters 250, and descreen filters 256. In several embodiments, memory 241 includes RAM like the main RAM of a computer system and/or flash. In other embodiments, memory 241 may include read only memory (ROM) or compact disk (CD) ROM for target image data 242 and descreen filters 256, and volatile memory for parameters 252. In further embodiments, memory 241 may include data storage devices like optical drives, hard drives, and the like.

Target image data 242 may include one or more digital files corresponding to scanned and printed targets to facilitate detection and correction of distortions associated with components of the reprographic system. In the present embodiment, target image data 242 includes step wedge 243 as a target to enhance image processing for printers and measured data 244 as digital data for a photograph quality target for image processing enhancement of scanners. Step wedge 243 includes N steps equal RGB values and four N-step wedges representing each CMYK color. Measured data 244 includes digital data for a standard IT8 target like measured density data and other color metric data.

Parameters 250 include user parameters 251 and first stage correction parameters like scanner parameters 252, and printer parameters 254. User parameters 251 include parameters associated with user imposable image adjustment curves. Scanner parameters 252 store first stage correction parameters for each enhanced scanner. Similarly, printer parameters 254 stores correction parameters for each enhanced printer and the number and types of correction parameters for each printer may depend upon the configuration of the printer and user preferences.

Descreen filters 256 include filters like median filters, unsharp masks, and Gaussian blur filters. Some embodiments offer standard sets filters and adjustable filters to produce higher quality images. Other embodiments may be adapted for increased production, offering standard sets of filters. Further embodiments offer both default filters and user-adaptable filters.

Image adjuster 260 couples with I/O interface 210 to receive and distribute scanned data and with controller 215 and memory 241 to implement first stage correction parameters developed for scanners, printers, user preferences, and digital files involved with a reprographic function. In the present embodiment, image adjuster 260 also couples with error detector and parameter generator 230 for dynamic, second stage enhancements to detect distortions like halftoning associated with digital images received for printing. Image adjuster 260 includes scanner image adjuster 262 and printer image adjuster 282. In many embodiments, image adjuster 270 also includes image reduce/enlarge 280 to reduce or enlarge the image in response to user input.

Scanner image adjuster 262 modifies scanned data of documents scanned by a corrected scanner to remove or attenuate detected errors. Further, when different correction parameters are associated with the first and second sides of a document and with the documents placed on the flatbed of the calibrated scanner, scanner image adjuster 262 identifies the corresponding correction parameters. Scanner image adjuster 262 includes skew 264, color 266, gray balance 268, and color fringe 270.

Skew 264 detects and corrects for misalignments of documents associated with a scanner in the second stage. Skew 264 may look at the entire scanned image determine whether the scanned document is slanted. For instance, a document feeder for a scanner may feed the document in at a slant, particularly when feeding documents via the vertical or longer edge of the document and the scanned document will be slanted. Upon recognizing the skew, skew 264 may generate correction parameters for the scanner to correct for the slant. Thus, correction parameters for skew are generated and image adjuster 260 dynamically detects and implements an enhancement tool to correct for skew when skew is detected. In particular, corrections will be implemented when the comparison reveals distortion that exceeds a threshold distortion to increase the performance of the reprographic system when the distortion is minor.

Similarly, color 266, gray balance 268, and color fringe 270 implement correction parameters associated with a corrected scanner to modify scanned data for distortions associated with color values identified by the corrected scanner. For example, when a user selects a reprographic function involving a corrected scanner such as a scan function via controller 215, scanner image adjuster 262 identifies an entry for the calibrated scanner in scanner parameters 252 and determines whether correction parameters are available for color 266, gray balance 268, and color fringe 270. When, e.g., color correction parameters are available, color 266 modifies the scanned data of each document scanned by that scanner.

Color 266 applies first stage correction parameters to correct the color values represented in scanned data. Gray balance 268 applies first stage correction parameters to identify and correct for color levels that should be substantially equivalent.

Color fringe 270 applies color value corrections to adjust color values at edges of color levels represented in the scanned data. Color fringe can be very noticeable in, e.g., black text. In several embodiments, color fringe 270 employs edge enhancement techniques to alter the color values in the edges outlining patches of color values based upon the color levels of the patches.

Image adjuster 260 may then implement user preference correction parameters on the scanned data for each document scanned. In some embodiments, image adjuster 260 may include a correction parameter combiner to combine scanner, user, and/or printer correction parameters, providing faster reproduction processes. More specifically, when a user selects a reprographic function such as copy, image adjuster 260 may dynamically combine gray balance for the scanner and printer selected for copying and for user preference parameters from user parameters 251. For example, to produce copies of a large document more quickly, the document may be split between more than one scanner and more than one printer. In particular, the user may instruct the reprographics system to distribute scanned documents from a work group scanner to more than one printer via controller 215. In such circumstances, correction parameters for each scanner and printer combination may be combined to reduce the time involved with correcting distortions inherent to the corresponding components for each document.

Printer image adjuster 282 may adjust data to print to a printer by locating printer correction parameters in printer parameters 254 that are associated with the printer and modifying image data based upon the correction parameters. Printer image adjuster 282 may convert data scanned from a scanner into a postscript file or the like to forward to the printer.

Printer image adjuster 282 may include dynamic, second stage image processing enhancement tools like page segmenter 283, text 284, color image adjuster 287, and data compressor 291. Page segmenter 283 separates black text or line art data from color image data to perform distinct, and in some embodiments, parallel, image processing techniques adapted to enhance the quality of copies printed by one or more printers. For example, when a user wants to print black and white documents, page segmenter 283 processes the black and white data via text 284 to improve or optimize image processing for that data. On the other hand, when the user wants to print color image data, page segmenter 283 processes the data via color image adjuster 287. Further, when the user wants to print, e.g. as part of a copy function, a document having both black text and color image data, page segmenter 283 may separate the image data for the document into data for black and white processing and data for color image processing if separate processing of the data is advantageous.

Depending upon the printing techniques associated with the corrected printer, evaluated by error detector and parameter generator 230 and described in printer parameters 254, page segmenter 283 may send mixed documents having black text and color image data to color image adjuster 287 and not separate the black text from the color image. For instance, a high quality laser printer with a CMYK process with gray balance and a high frequency halftone having a multi-level halftoning process may print an acceptable quality of black text so image processing techniques selected for that printer may not include segmentation. Thus, the printing process may be improved or optimized by skipping the segmentation process.

Text 284 provides second stage image enhancement by processing black and white data for a document to enhance text quality and edges associated with the data, producing a substantially high quality print. In particular text 284 includes scaler 285 and binarizer 286. Scaler 285 may receive color data like 300 dpi with 24 bits in a color space such as an RGB color space and scale the data to 600 dpi with 8 bits of gray data.

Binarizer 286 may binarize gray data from levels of gray to black pixels. For instance, upon receipt of 600 dpi with 8 bits of gray, binarizer 286 may transform the data to 600 dpi with one bit of black. Thus, when the binary data is transmitted to a printer, the printer can produce improved or optimized black text with sharp edges and better performance.

Color image adjuster 287 may process color image data of a document to improve quality, and, in some cases, provide a higher quality print than the original document. In particular, color image adjuster 287 implements first stage correction parameters of printer parameters 254 to compensate for distortions associated with a calibrated printer. Color image adjuster 287 may include gray balance 288, and descreener 290.

Gray balance 288 implements first stage, correction parameters from printer parameters 254 to remove distortions in the equivalence of color levels associated with a targeted printer upon receipt of a digital image. For instance, printer parameters 254 may include three, color curves, e.g., red, green, and blue. Translating the color values of the digital image to the color values indicated on the curves improves the gray balance output by the printer for the digital image.

Descreener 290 provides dynamic, second stage, image processing enhancement and is designed to implement a descreen filter of descreen filters 256 based upon a halftone frequency identified for the printer and/or halftones identified for the image to be printed. For example, image adjuster 260 receives a digital color image to print on a printer from a scanner or an electronic file and employs image detector 240 to determine the halftone frequency associated with the digital color image. In the present embodiment, image detector 240 also determines an indication of the pattern of the halftone distortion and areas of the image data that are significantly affected by the halftones. Page segmenter 283 identifies the digital color image and initiates color image adjuster 287 to process the image. Descreener 290 checks printer parameters 254 for a halftone frequency associated with the printer. Then, based upon the frequencies and techniques of the halftones associated with the digital color image and the printer, descreener 290 selectively applies a smoothing filter from descreen filters 256 to attenuate interactions between the halftones of the digital color image and the printer.

Printer image adjuster 282 may also include a data compressor 291 coupled with text 284 and color image adjuster 287 to compress image data of a document for transmission across a network to a printer. In the present embodiment, data compressor 291 includes binary 292 to compress binary data received from text 284 and joint photographic experts group (JPEG) 294 image compression to compress color image data received from color image adjuster 287 or color binary compression like Joint Bi-level Image Experts Group (JBIG) 296 for color binary data. In further embodiments, printer image adjuster 282 may combine the compressed binary and image data to produce a postscript file to transmit to a printer or PDF for email.

FIG. 3 depicts an example flow chart 300 of a method to enhance image processing for a scanner. Flow chart 300 begins with element 310, receiving instructions to calibrate scanner A. The instructions may result from user input or may result from a user action such as coupling the scanner to the reprographic system. In some embodiments, a controller may receive instructions to enhance image processing for a scanner and the scanner is identified at a memory location.

In element 315, the user is instructed to place a target in scanner A for first stage enhancement. For instance, the reprographic system may include one or more targets in the form of prints or photographs designed to facilitate enhancement of image processing for scanners. In such embodiments, a data storage unit such as non-volatile memory or a compact disk read only memory (CD ROM) of the reprographic system includes digital files with measured density data and/or other color metric data corresponding to the targets. The digital files describe the color levels associated with the targets to a suitable level of accuracy. In many of these embodiments, the target is a standard IT8 target like Kodak Q60R1.

Scanner A is instructed to scan the image, typically in an RGB format. When the scanner includes doubled-side scanning wherein the second side of the document may be scanned by a separate set of optics, scanned data from the second set of optics is also generated for comparison to the target data to determine distortions associated with the second set of optics and/or the document feeder. Further, when the scanner facilitates flatbed scanning, since errors resulting from a document feeder may not be incorporated into the scanned data when a document is placed directly on the flatbed, scanned data is generated for a target placed directly on the flatbed by a user to detect distortions resulting from the optics of the scanner.

Element 325, detects the gray balance of the scanner by comparing gray levels of the target data with gray levels of the scanned data. In particular, color values in gray patches of the scanned data are evaluated to determine whether the gray patches of the scanned data have a color cast such as red, green, or blue. For example, the scanner generates RGB color values for each of the gray patches on the target. Each of the RGB color values within the same level of gray should represent equivalent color levels of red, green, and blue such as 128 for red, 128 for green, and 128 for blue. When the scanner perceives, e.g. blue as 135, the color values describe the gray patch as having a blue cast. If the gray balance distortion exceeds a gray balance threshold, element 325 generates correction parameters to compensate for the distortion.

Further, the gray balance distortion of the scanner may not be linear with respect to physical location and/or color levels. In particular, different areas of the target having the same gray level may be interpreted with different color casts and different levels of gray may be interpreted with different color casts. Thus, some embodiments may evaluate multiple samples of gray levels from more than one physical location in the target and generate correction parameters to compensate for one or both of these distortions, if the distortions exceed selected thresholds.

Element 330 evaluates the scanned data to detect color fringe. Color fringe is a misalignment of RGB color planes in the scanned data and can be very noticeable, e.g. in black text. Correction parameters for color fringe will be generated if the distortion exceeds a fringe threshold such as a quarter of a pixel. The fringe threshold may be set by default and, in many embodiments, by a user preference. The user preference can be a general preference for balancing speed with quality such as a bar having steps ranging from optimized for speed to optimized for quality and when the user selects a setting, multiple thresholds for various forms of distortion correction may be modified based upon the setting. In further embodiments, the fringe threshold setting is selected directly by a user, such as select gradations of low to high image quality.

In element 335, color values represented in the scanned data are compared with a measurement of the target data to determine the color accuracy of the scanner. More specifically, colors values from each level of each color of the target data are compared with the corresponding color values of the scanned data and when the differences exceed a threshold, correction parameters are generated to compensate for the difference. Differences between color values in the scanned data of the scanner target and the target data may be used to generate correction parameters such as a 3 by 3 color matrix, 3 by N color matrix, polynomial settings, or look-up tables. For example, when the scanner target is an IT8 chart, color values of patches may be averaged and compared with the color values of the target data to determine corrections for scanner. Further, correction parameters for colors may be interpolated to determine correction parameters for colors that are not represented in the scanner target. In one embodiment, the colors values of the scanned data are determined by averaging color values of an area within the corresponding color patch. The correction parameters are, in further embodiments, stored in the form of points on a curve or a function representing a curve. When the correction parameters are stored in the form of points, color levels that are between the color levels of the target data may be interpolated to determine color value corrections. On the other hand, a curve-fitting algorithm may generate a function and store the correction parameters as the function.

FIG. 4 depicts an example flow chart 400 of a method to enhance image processing for a printer. The flow chart 400 begins with element 410, receiving instructions to calibrate printer B with first stage corrections. More specifically, the user couples a printer to a local printer port of the reprographic system and, upon recognizing the new, uncorrected printer B, the reprographic system responds by prompting the user to enhance image processing for printer B. The user confirms the request so element 415 prints a target to printer B. For instance, the reprographic system may include one or more targets in the form of digital files to print when enhancing image processing for printers. In such embodiments, a data storage unit such as non-volatile memory or a CD ROM of the reprographic system includes the digital files corresponding to the targets.

The user is instructed to place the printed target in a corrected, or enhanced, scanner and, in element 420, scanner A is instructed to scan the printed target. The number of pixels across the printed target is determined by the resolution of the scanner, e.g. 600 dpi with 24 bits of color for each pixel, or 8 bits of data for red, 8 bits of green, and 8 bits of blue for each pixel.

Then, element 425 accesses and modifies scanned data based upon first stage, correction parameters determined for scanner A. The correction parameters may include data describing modifications for the scanned data to correct for distortions such as gray balance, color fringe, and color discrepancies.

Element 430 detects the halftone frequency associated with the printed target. The digital file for the target typically has no halftones so the halftones in the printed target are halftones associated with the printer. The halftone frequency of the printer facilitates a determination of an interaction between halftones of a scanned document to print and that printer. For instance, when the user selects the copy reprographic function, an image detector detects the halftone presence and frequency in the original. The halftone frequency is compared with the halftone frequency of the printer and, if an interaction between the halftones is determined to be an unsuitable distortion, the halftone frequency of the original is used to select a descreen filter to modify the scanned data of the original, smoothing or blurring the halftones. In many embodiments, edges of the original may be enhanced while blurring the half tones to attenuate or offset the destructive effects of blurring. In further embodiments, the descreen filters may be dynamically selected in the second stage based upon the frequency of the printer and implemented prior to printing to improve the quality of the resultant print.

In element 435, the gray balance of the printer is detected and correction parameters for the gray balance are generated. A printer is gray balanced when the printer can print a gray without a color cast. The gray balance of the printer may determine the amount of processing to implement for data to be printed. For instance, when the color cast of a gray is very minor, i.e., imperceptible or substantially imperceptible by the human eye, or below a selected threshold for the reprographic system, the reprographic system may ignore the color cast to increase the speed of printing an image. On the other hand, when the color cast of a gray is above the threshold for the system, correction parameters are generated to remove the color cast.

The correction parameters are typically stored in non-volatile memory coupled with or within a component of the reprographic system and, in some embodiments, one or more default sets of correction parameters may be stored as a starting point to operation prior to calibration. Thus, the user can easily re-calibrate a reprographic component for any difference or change in circumstances such as using a different kind of paper, upgrading a scanner, upgrading a printer, or the like.

FIG. 5 depicts an example flow chart 500 of a method to copy via a corrected scanner and a corrected printer. The flow chart 500 begins with element 510, receiving instructions to copy via scanner A and printer B. After instructing scanner A to scan the document(s) (element 515), the reprographic system corrects the scanned page data of the document for distortions associated with scanner A and printer B (element 520). More specifically, the page data may be modified to account for first stage and second stage distortions associated with the printer and/or scanner such as gray balance, skew, and color fringe. For example, both printer B and scanner A include gray balance distortions. The gray balance correction parameters for printer B and scanner A are combined to create a single set of corrections for gray balance and the set of corrections are applied to the page data. The combined set of correction parameters may offer a one to one correspondence between substantially accurate color levels and color levels associated with the page data, reducing the number of data manipulations per document to increase performance of the reprographic system.

In element 525, correction parameters for color level distortions associated with scanner A are applied to the page data. The correction parameters for color level distortions may describe one to one color value corrections for color levels of the RGB color gamut. In other embodiments, the color corrections may include color correction values in another color space.

Element 530 filters the page data of documents being copied with a descreen filter. The descreen filter may be applied when the distortion associated with an interaction between halftones of the page data and printer B is determined to be significant. In particular, when the halftone frequency of printer B is close to the halftone frequency the page data of a document, a Moiré pattern may be perceptible in the print when printed with printer B. When these frequencies are within a selected frequency range, a descreen filter is dynamically selected and applied to the page data. The descreen filters may include dynamic descreening and edge enhancement. For example, the page data may be blurred to remove halftone interference while sharpening edges of colors represented in the page data.

Element 535 adjusts the page data of each page in the document with user preferences. For instance, the user may select a preference to desaturate color levels of the document being copied.

Element 540 compresses the resulting page data of each page in the document and transmits the compressed data to printer B. In particular, the network topology of the reprographic system may include bandwidth limited communication mediums between the image processing unit and the printer so data compression reduces the amount of data that is transferred across the communication channels to increase performance of the reprographic system. In several embodiments, the compression may include an image compression that can be interpreted by printer B's driver software such as a JPEG format.

FIG. 6 depicts an example flow chart 600 of a method including image processing enhancement to copy an image having both text and image data via scanner A and printer B. The flow chart begins with element 600, receiving instructions to copy via scanner A and printer B with a default user preference curve. More specifically, the user requests a copy of a document located in scanner A to be copied and printed to printer B and did not request a specific user preference such as increase or decrease contrast. A default user preference, however, may include one or more user preferences. For example, the main function of the reprographic equipment in an office may be to copy text documents with some color image documents and some mixed documents. The text documents may be repeatedly copied, deteriorating the contrast of the documents and the dark tone of the text so the default user preferences can be set to increase contrast one level and increase darkness by one level. Increasing the contrast by one level is associated with a user preference curve and increasing darkness by one level is associated with a second user preference curve, both of which are located in memory.

The reprographic system instructs scanner A to scan the image. In other embodiments, the reprographic system may instruct the user to press a scan button when the image is placed in the scanner. Then, element 615 adjusts the scanned data based upon the color fringe distortions if correction parameters were generated for color fringe distortions when scanner A was calibrated. In particular, some scanners may not have a significant color fringe problem, e.g., the pixel offset of an RGB color value may be so small that the amount of color distortion in the outlying area of an image, such as a black text character, is not sufficient to justify processing each page for the distortion. The amount of distortion justifying correction may be incorporated in the form of a default setting and the setting may be adjustable via a user preference.

In element 620, the page data of the document being copied is corrected for skew if the skew distortion is sufficient to justify the additional image processing. For example, when scanner A scans a page from a flatbed or a document feeder, the resulting page data may be offset and/or rotated. Correction parameters are designed to characterize the offset and/or rotation so the page data of each page of the document can be corrected.

Element 625 adjusts color values of the page data to attenuate scanner distortions related to color accuracy and gray balance. In particular, scanner A may misrepresent color values for each pixel and correction parameters designed to correct for the distortion may be applied to the page data. For example, with regards to gray balance, scanner A may represent a gray level with unequal color values of RGB data and correction parameters designed to correct for these differences are applied to the page data.

Scanner A may also misrepresent a color value. Corrections for such distortions involve adjusting the color values of pixels by the difference(s) associated with the misrepresentation such as by 3 by 3 matrix, look-up tables, or polynomial data settings.

In element 630, the page data may be segmented or directed through a processing channel for black text when the printing technique of printer B will not adequately reproduce black text data of the page data. More specifically, when printer B has a gray balance distortion and halftones with a coarse frequency such as a frequency below 170 dpi or otherwise heuristically determined range of frequencies, and the page data includes black text, the black text data of the page data will be directed through text correction processing, elements 640 and 645. When the page data also includes image data, the image data is directed through image correction processing, elements 650, 655, and 660. Further, when the page data includes both black text and a color image, the black text may be separated from the color image to process the text data with text correction processing and the image data with image correction processing. Other circumstances may also warrant separate processing for the black text data, or even images of black data in general, from the image data such as low halftone frequency associated with the printer or the page data, a color fringe problem associated with the printer, one or more minor distortions associated with the selected printer or scanner that may or may not have instigated the generation of correction parameters, etc. Such other circumstances may be selected by default and/or by user preferences.

Scaling 640 involves generating bits of gray data for a pixel based upon color bits for the pixel. For instance, when the black text data is scanned by a scanner in the RGB color space, three sets of data are generated for each pixel; red, green, and blue. The three sets of color data provide a significant amount of data for determining black color values for the data so, e.g., 300 dpi with 24 bits of RGB data can be scaled to 600 dpi with 8 bits of data for gray. The scaled data may then be binarized to 600 dpi with one bit of data for black, providing a sharp edge for black text. Then, element 645 compresses the black text data for transmission to printer B.

Element 650 begins corrective processing for the image data and includes adaptive descreening with edge enhancement. Image data may include color images or black and white images in RGB color space. However, in some embodiments, image data is represented in another color space like a color space supported by ICC or other standard. Adaptive descreening with edge enhancement is designed to filter out halftones from the page data to prevent halftones generated by printer B from interfering with or interacting with halftones of the image data and to dynamically determine edges of images described in the image data so the halftones may be blurred while adjusting edges to be more pronounced.

Element 655 adjusts color values of the page data including image data and, when black text data is not separated from the image data, black text data. These adjustments may be based upon user preferences. Then, element 660 compresses the page data for transmission to printer B and element 670 transmits the compressed image data and/or black text data or page data to printer B for printing.

In other situations, the page data may be a file received by email, by fax via a fax modem, or from a file directory on a network coupled with the reprographic system. For example, a user may indicate the location of the file to print to the reprographic system and the reprographic system may process the file like page data above. In some embodiments, an email address assigned to the reprographic system may designate emails to print upon receipt. The persons for whom the email is addressed can be recognized by the reprographic system and a default printer, the printer in the office of that person, is designated as the printer for printing that email. In still other situations, the page data may be forwarded to email addresses, a fax machine, and/or to a file directory in response to user input.

Figure 7:
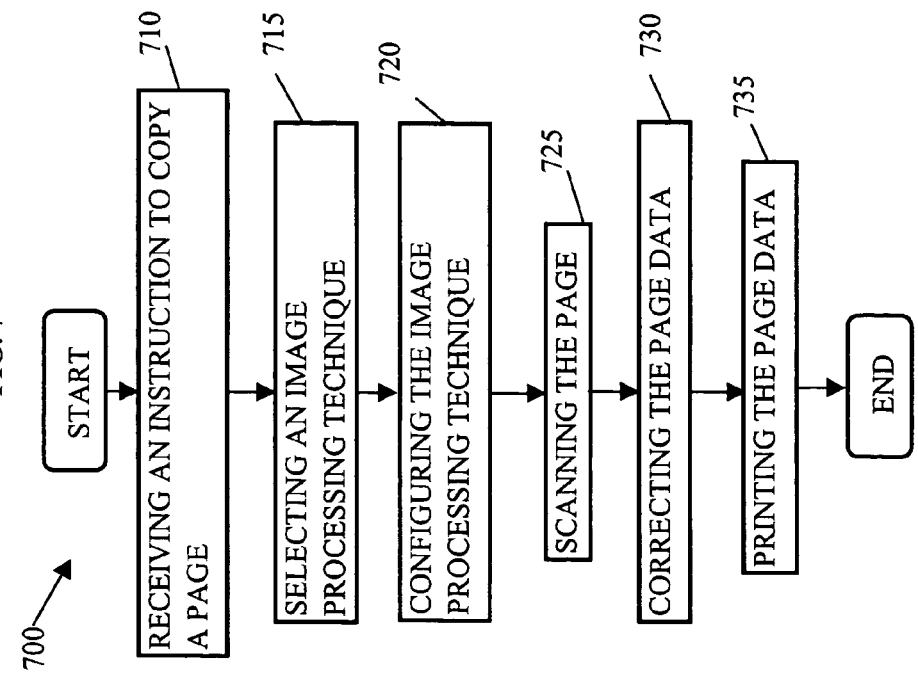

FIG. 7 depicts an example flow chart 700 of a method including dynamically selecting image processing enhancement techniques based upon detected characteristics or distortions associated with a scanner and printer, and configuring the techniques to copy a page with a modular color reprographic system. The flow chart begins with element 710, receiving instructions to copy a page. More specifically, the user requests a page located in the scanner to be copied and printed to the printer.

In element 715, one or more image processing techniques are selected. For instance, gray balance processing may be selected for the scanner and/or printer depending upon characteristics detected and stored for the scanner and printer during the first stage, or calibration stage. Descreening may be selected, e.g., when the printer does not perform error diffusion or when the halftone frequency associated with the printer is coarse. And color fringe processing may be selected when a color fringe distortion above a color fringe threshold is associated with the scanner. Segmentation may be selected the printer prints a low quality text with color inks based upon a determined or selected criteria for text quality. Other image processing techniques may be selected as well, depending upon the techniques available and the detected characteristics of the scanner and printer.

In element 720, the image processing techniques selected in element 715 are configured for the particular scanner and printer. For example, when a descreening process is selected, the halftone frequency determined for the printer is taken into account to select a descreen filter.

In element 725, the page is scanned and in element 730, corrections based upon the selected image processing technique(s) and the detected characteristics of the scanner and the printer are implemented. In further embodiments, the page data may also be corrected for other distortions associated with the scanning of the page such as skew.

In element 735, the printer prints the corrected page data. For instance, the page data may be compressed and/or incorporated into a postscript file. Then, the data transmitted to the printer or a printer queue for the printer.

One embodiment of the invention is implemented as a machine-accessible medium for use with a reprographic system such as, for example, system 100 shown in FIG. 1 and described below. The program(s) of the machine-accessible medium defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive; magnetic disk storage media; optical storage media; and flash memory devices); and (iii) information conveyed to a computer by a communications medium, such as through a computer or telephone network, including wireless communications such as electrical, optical, acoustical or other form of propagated signals (e.g. carrier waves, infrared signals, digital signals, etc.). The latter embodiment specifically includes information downloaded from the Internet and other networks. Such signal-bearing media, when carrying machine-accessible instructions that direct the functions of the present invention, represent embodiments of the present invention. Some embodiments of the present invention can include more than one machine-accessible medium depending on the design of the machine.

In general, the routines executed to implement the embodiments of the invention, may be part of an operating system or a specific application, component, program, module, object, or sequence of instructions. The program(s) of the present invention typically are comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates involve methods, systems, and media to calibrate a reprographic system. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method for enhancing image processing for a color reprographic system, the method comprising:
    scanning a scan target having known characteristics with a scanner to generate scanner data;
    detecting a gray balance distortion in the scanner data with respect to the known characteristics and generating scanner gray balance parameters when the gray balance distortion exceeds a balance threshold;
    detecting a color distortion in the scanner data with respect to the known characteristics and generating scanner color parameters;
    printing a printer target from a digital target with a printer;
    scanning the printed target with the scanner to generate printer data;
    correcting the scanned printer target based upon parameters generated for the scanner;
    determining a halftone frequency of the printer based upon the corrected scanned printer target; and
    selecting a descreen filter based upon the halftone frequency of the printer.

2. The method of claim 1, further comprising detecting a skew in the scanner data with respect to the known characteristics and generating skew parameters when the skew exceeds a skew threshold.

3. The method of claim 2, wherein detecting the skew comprises detecting a rotation of the scanned target with respect to the scanner data.

4. The method of claim 1, further comprising detecting a color fringe with respect to the known characteristics and generating scanner fringe parameters when the color fringe exceeds a color fringe threshold.

5. The method of claim 4, wherein detecting the color fringe comprises evaluating red, green, and blue pixels in an outline area of a gray patch.

6. The method of claim 1, further comprising detecting distortion associated with gray balance of the printer and generating parameters when a gray patch in the scanned printer target has a colorcast.

7. The method of claim 1, wherein scanning the scanner target comprises scanning a standard IT8 target.

8. The method of claim 1, wherein detecting the gray balance distortion comprises determining a difference between the color values for red, green, and blue pixels generated by the scanner and the known characteristics associated with a gray patch.

9. The method of claim 1, wherein detecting the color distortion comprises generating a curve for a hue based upon the color distortion.

10. The method of claim 1, wherein printing the printer target comprises printing a step wedge.

11. The method of claim 1, wherein determining the halftone frequency of the printer further comprises determining that the halftone frequency of the printer is coarse.

12. An apparatus for enhancing image processing for a reprographic system, the apparatus comprising:
    a scanner detector to compare color image data with target data to detect differences between the color image data and the target data with respect to a gray balance distortion of a gray patch and a scanner color distortion of color values of pixels in the color image data, and to generate scanner correction parameters to compensate for the scanner color distortion and for the gray balance distortion of a scanner when the gray balance distortion exceeds a balance threshold, when the color image data is generated from a scan of a scanner target associated with the target data via the scanner;
    a printer detector to detect a halftone frequency with a printer based upon a pattern of pixels in the color image data and differences between the color image data and the target data with respect to a printer color distortion of color values of pixels in the color image data, and to generate printer correction parameters to describe the printer color distortion and the halftone frequency when the halftone frequency associated with the printer is below a threshold frequency, when the color image data is scanned from a printed target from the printer; and an image adjuster coupled with the scanner detector and the printer detector to adjust pixels of the color image data for distortions based upon the scanner correction parameters generated for the scanner when the scanner is associated with the color image data and the printer correction parameters generated for the printer when the printer is associated with the color image data, and to apply a descreen filter associated with the halftone frequency to adjust pixels of the color image data when the color image data is to be printed by the printer.

13. The apparatus of claim 12, further comprising a user interface coupled with the scanner detector and the printer detector to associate user preferences with user parameters and coupled with the image adjuster to modify the color image data based upon the user parameters.

14. The apparatus of claim 12, wherein the printer detector comprises a gray balance detector to detect a gray balance distortion in the color image data with respect to the target data when the color image data is generated from a scan of the printer target and to generate parameters to correct for the gray balance distortion.

15. The apparatus of claim 12, wherein the image adjuster comprises a skew detector to detect a skew the color image data with respect to the target data when the color image data is generated from a scan of the scanner target and to generate parameters to correct for the skew.

16. The apparatus of claim 12, wherein the image adjuster comprises a data compressor to compress data to send to the printer.

17. The apparatus of claim 12, wherein the image adjuster comprises a page segmenter to separate text data from the color image data to process the text data separately.

18. The apparatus of claim 17, wherein the page segmenter comprises:

a scaler to scale the text data and a binarizer coupled with the scaler to binarize the text data.

19. The apparatus of claim 12, wherein the image adjuster comprises edge enhancement to enhance edges associated with the color image data.

20. A computer readable medium tangibly embodying programmed instructions which, when executed by a computer system, are operable for enhancing image processing for a color reprographic system, the method comprising:

scanning a scan target having known characteristics with a scanner to generate scanner data;

detecting a gray balance distortion in the scanner data with respect to the known characteristics and generating scanner balance parameters when the gray balance distortion exceeds a balance threshold;

detecting a color distortion in the scanner data with respect to the known characteristics and generating scanner color parameters;

printing a printer target from a digital target with a printer;

scanning the printed target with the scanner to generate printer data;

correcting the scanned printer target based upon parameters generated for the scanner;

determining a halftone frequency of the printer based upon the corrected scanned printer target; and selecting a descreen filter based upon the halftone frequency of the printer.

21. The method of claim 20, further comprising:

receiving an instruction to copy a page via a scanner and a printer;

selecting an image processing technique from a set of image processing techniques based upon detected characteristics of the printer and the scanner;

configuring the image processing technique based upon the detected characteristics;

scanning the page;

correcting the page data based upon the configured image processing technique; and printing the page data with the printer.

22. The method of claim 21, wherein correcting the page data comprises correcting the page data with skew parameters when a skew distortion of the scanner data exceeds a skew threshold.

23. The method of claim 21, wherein correcting the page data comprises enhancing edges in the page data.

24. The method of claim 21, wherein correcting the page data comprises adjusting color values of the page data based upon a user input.

25. The method of claim 20, further comprising:

receiving page data to print with the printer;

separating black data represented by pixels in a color space and color image data from the page data;

binarizing the black data to convert the black data to black color values;

determining whether the halftone frequency associated with the scanned printer target interacts with a halftone frequency associated with the page data;

filtering the color image data with a halftone frequency filter associated with a halftone frequency of the page data when the halftone associated with the page data is determined to interact with the halftone frequency associated with the scanned printer target;

correcting the color image data with the printer correction parameters; and printing a combination of the binarized black text data and the corrected color image data via the printer.

26. The method of claim 25, further comprising compressing the page data for transmission to the printer.

* * * * *

UNITED STATES PATENT AND TRADEMARK OFFICE
CERTIFICATE OF CORRECTION

PATENT NO. : 7,639,392 B2 Page 1 of 1
APPLICATION NO. : 10/693760
DATED : December 29, 2009
INVENTOR(S) : Li et al.

It is certified that error appears in the above-identified patent and that said Letters Patent is hereby corrected as shown below:

On the title page, item [56]:
In the References Cited, please add U.S. Patent Document "5,791,568    2/1996    Wan".

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,639,392 B2 Page 1 of 1
APPLICATION NO. : 10/693760
DATED : December 29, 2009
INVENTOR(S) : Li et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1831 days.

Signed and Sealed this

Ninth Day of November, 2010

David J. Kappos
*Director of the United States Patent and Trademark Office*